(12) United States Patent
Maybee

(10) Patent No.: US 8,745,596 B2
(45) Date of Patent: Jun. 3, 2014

(54) PROGRAM DEBUGGING WITH DYNAMICALLY INSERTED INSTRUMENTATION

(75) Inventor: Paul Maybee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 12/366,238

(22) Filed: Feb. 5, 2009

(65) Prior Publication Data

US 2010/0199265 A1 Aug. 5, 2010

(51) Int. Cl.
*G06F 9/44* (2006.01)
*G06F 9/45* (2006.01)

(52) U.S. Cl.
USPC ............ 717/130; 717/124; 717/151; 717/158

(58) Field of Classification Search
None
See application file for complete search history.

(56) References Cited

U.S. PATENT DOCUMENTS

| | | | |
|---|---|---|---|
| 6,658,471 B1 | 12/2003 | Berry et al. | |
| 6,918,110 B2 | 7/2005 | Hundt et al. | |
| 7,293,259 B1 | 11/2007 | Dmitriev | |
| 8,006,232 B1* | 8/2011 | Rideout et al. | 717/124 |
| 8,209,674 B2* | 6/2012 | Meijer et al. | 717/151 |
| 8,245,200 B2* | 8/2012 | Baierl et al. | 717/130 |
| 8,266,608 B2* | 9/2012 | Hecht et al. | 717/158 |
| 2002/0199172 A1* | 12/2002 | Bunnell | 717/128 |
| 2004/0205720 A1 | 10/2004 | Hundt | |
| 2006/0195822 A1* | 8/2006 | Beardslee et al. | 717/124 |
| 2007/0168979 A1 | 7/2007 | Kumar et al. | |
| 2007/0240125 A1* | 10/2007 | Degenhardt et al. | 717/129 |
| 2008/0127118 A1* | 5/2008 | Kasman | 717/130 |
| 2010/0042982 A1 | 2/2010 | Aharoni et al. | 717/151 |
| 2010/0275185 A1* | 10/2010 | Burton et al. | 717/130 |
| 2012/0011491 A1* | 1/2012 | Eldar | 717/130 |

OTHER PUBLICATIONS

Olszewski et al., JIT instrumentation: a novel approach to dynamically instrument operating systems, Jun. 2007, 14 pages.*
Tzoref et al., Instrumenting where it hurts: an automatic concurrent debugging technique, Jul. 2007, 11 pages.*
Nulkar, et al., "An Instrumentation Engine for Dynamic Program Analysis", retrieved at <<http://www.chillarege.com/fastabstracts/issre2003/166-FA-2003.pdf>>,ISSRE 2003, pp. 2.

(Continued)

*Primary Examiner* — Thuy Dao
(74) *Attorney, Agent, or Firm* — Kevin Sullivan; Brian Haslam; Micky Minhas

(57) ABSTRACT

The present disclosure simplifies programming debugging by dynamically injecting debugger compiled instrumentation into the debuggee process such that the debuggee process executes the instrumentation without executing the debugger. In one example method, the debugger controls compiling a description of the instrumentation as an instrumentation method. The debugger can then write the instrumentation method into the debuggee. The debuggee can save the state of a target method of the debuggee process at a predetermined location. The debuggee process calls the instrumentation method from the debuggee. In addition, the state of the target method can be restored and the resumed from the predetermined location after the instrumentation method executes.

15 Claims, 4 Drawing Sheets

(56) References Cited

OTHER PUBLICATIONS

Zaidman, et al., "Program Comprehension through Dynamic Analysis", retrieved at <<http://www.lore.ua.ac.be/Events/PCODA2005/PCODA2005proceedings.pdf>>, 12th Working Conference on Reverse Engineering (WCRE'05), Nov. 10, 2005, pp. 65.

Zhou, et al., "iWatcher: Efficient Architectural Support for Software Debugging", retrieved at <<http://opera.cs.uiuc.edu/paper/iWatcher-toppicks.pdf >>, pp. 4. (2004).

Kumar, et al., "Transparent Debugging of Dynamically Instrumented Programs", retrieved at <<http://www.cs.pitt.edu/~naveen/papers/wbia05.pdf>>, pp. 6. (2005).

Zhao, et al., "How to do a Million Watchpoints: Efficient Debugging using Dynamic Instrumentation", retrieved at <<http://dspace.mit.edu/bitstream/handle/1721.1/35778/CS005.pdf?sequence=1>>, pp. 9. (2008).

\* cited by examiner

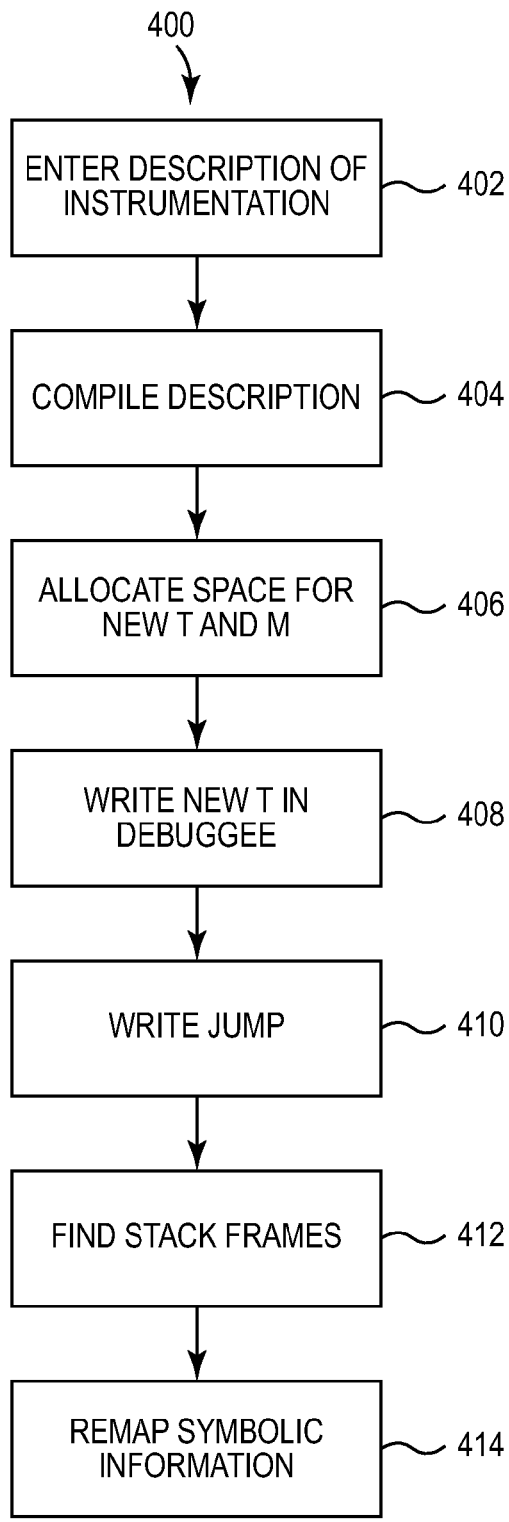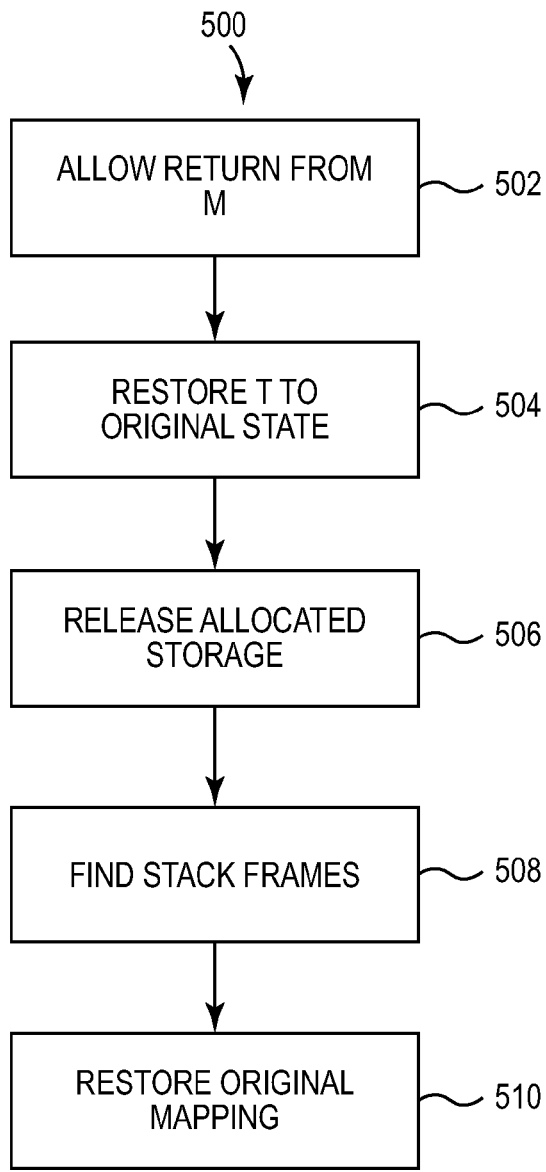
Fig. 4
Fig. 5

PROGRAM DEBUGGING WITH DYNAMICALLY INSERTED INSTRUMENTATION

BACKGROUND

Program debugging, or debugging, is a methodical process of finding and reducing the number of bugs, or defects, in a computer program or a piece of electronic hardware to make the computer program behave as expected. Debugging in general is a lengthy, tiresome task, and programmers often use a software tool such as a debugger operating on a debuggee process to monitor execution of the computer program and to perform program debugging. During investigation of the program, the programmer may stop the execution of the debuggee process, collect data values, or otherwise affect the execution of the debuggee process based on the values of the variables. The program may know the points of investigation and build the logic into the program, or the programmer can make use of the debugger to place instrumentation.

The use of the debugger can provide difficulties in program debugging. For example, the range of possible instrumentation varies depending on the debugger used, and thus the programmer will use care to select the correct debugger if one even exists. Further, the cost—in terms of delayed execution while the instrumentation is evaluated—is often prohibitive because the delayed execution with the debugger is often several orders of magnitude slower than if the programmer had built the same instrumentation into the program. In many cases, the programmer will often choose to exit the debugger and modify the computer program rather than make use of the instrumentation features of the debugger.

Previous attempts to address these difficulties have included using breakpoints and debugger/debuggee communications with operating system facilities to provide instrumentation. The debugger is involved at every execution of the instrumentation. Program debuggers often allow the programmer to specify instrumentation points (such as conditional breakpoints, tracepoints, or the like) and a description to address ad hoc needs in the debugging process. The debugger implements these points based on the instrumentation point capability of the debugger. The debugger places an instrumentation point, such as a software interrupt instruction, into the program code of the debuggee process. When the debuggee executes the interrupt, the operating system pauses the execution of the debuggee process and notifies the debugger. The debugger executes the behavior specified in the instrumentation point description. For example, in the case of a conditional breakpoint, the debugger evaluates the conditional expression. Because these expressions often refer to program variables, the debugger makes call to the operating system to read the memory contents of the debuggee process and extract the variable values. If the condition evaluates true then the debugger notifies the programmer. Otherwise, the debugger notifies the operating system that then continues the execution of the debuggee process.

This course of pausing the debuggee process, executing the debugger, querying the debugger state, and continuing the execution of the debuggee process requires the execution of a relatively large amount of code. Further, specifying this instrumentation at a program location that executes frequently can cause a relatively large perturbation in the execution of the debuggee process even if the condition is never true. This often makes a conditional breakpoint feature impractical to use.

SUMMARY

This summary is provided to introduce a selection of concepts in a simplified form that are further described below in the Detailed Description. This summary is not intended to identify key features or essential features of the claimed subject matter, nor is this summary intended to be used to limit the scope of the claimed subject matter.

The present disclosure simplifies programming debugging by dynamically injecting debugger compiled instrumentation into the debuggee process such that the debuggee process executes the instrumentation without executing the debugger. In one example method, the debugger controls compiling a description of the instrumentation as an instrumentation method. The debugger can then write the instrumentation method into the debuggee. The debuggee can save the state of a target method of the debuggee process at a predetermined location. The debuggee process calls the instrumentation method from the debuggee. In addition, the state of the target method can be restored and the resumed from the predetermined location after the instrumentation method executes.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

FIG. 4 is a flow diagram illustrating one embodiment of a feature of the method performed in FIG. 3.

FIG. 5 is a flow diagram illustrating one embodiment of another feature of the method performed in FIG. 3

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
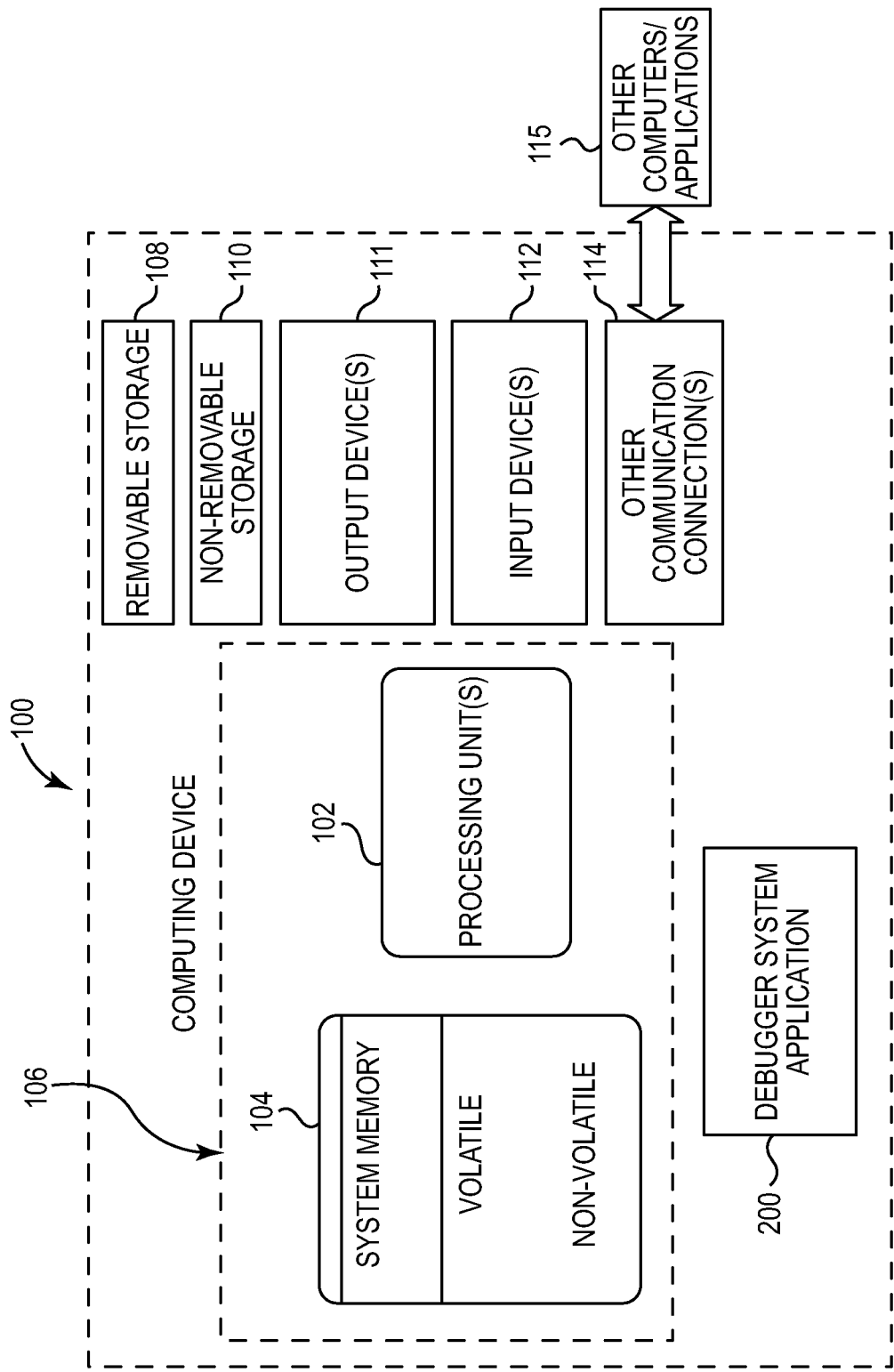
FIG. 1 is a schematic diagram illustrating a computer system according to one embodiment of the present disclosure.

As illustrated in FIG. 1, an exemplary computer system that can be employed to implement one or more parts of an example debugger system and/or an example debugging agent and/or an example debuggee process includes a computing device, such as computing device 100. In a basic configuration, computing device 100 typically includes processing unit(s) (i.e., processor(s)) 102 and memory 104. Depending on the exact configuration and type of computing device, memory 104 may be volatile (such as random access memory (RAM)), nonvolatile (such as read only memory (ROM), flash memory, etc.), or some combination of the two. This basic configuration is illustrated in FIG. 1 by dashed line 106.

Computing device 100 may also have additional features/functionality. For example, computing device 100 may also include additional storage (removable and/or non-removable) including, but not limited to, magnetic or optical disks, or tape, or flash storage devices. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

Figure 2:
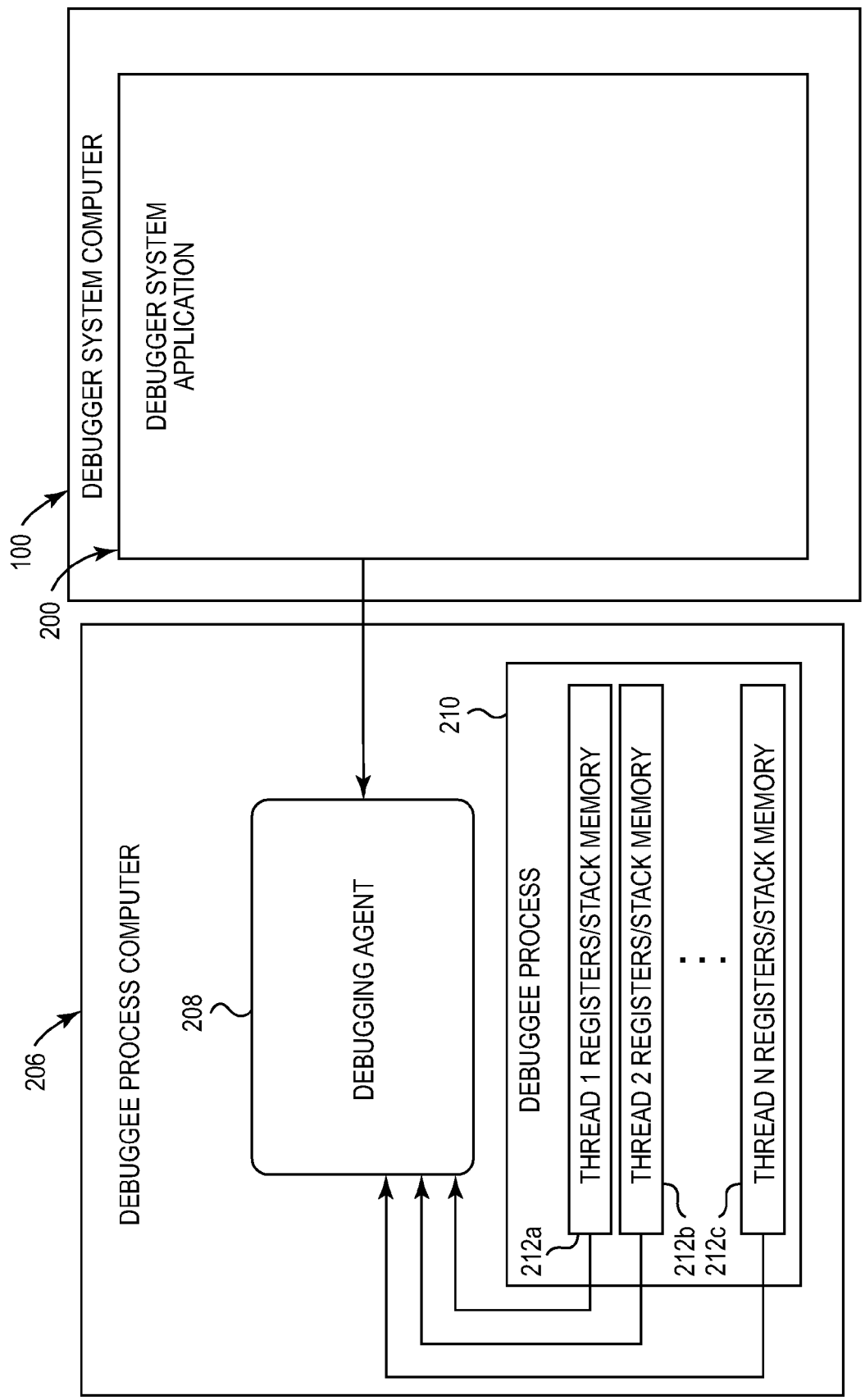
FIG. 2 is a block diagram illustrating one embodiment of a debugger system computer including a debugger system application interfacing with a debuggee process computer.

In one implementation, computing device 100 includes a debugger system application 200. Debugger system application 200 is described in further detail below with reference to FIG. 2. One embodiment of a debugger system computer 100 (e.g., computing device 100 illustrated in FIG. 1) comprising a debugger system application 200 interfacing with a debuggee process computer 206 (e.g., a computing device similar to computing device 100 illustrated in FIG. 1) comprising a debugging agent 208 and a debuggee process 210 is illustrated in FIG. 2.

Debugger system application 200, debugging agent 208, and debuggee process 210 can be implemented on any suitable type and suitable number of computer systems, such as computing device 100 illustrated in FIG. 1. In one embodiment, debugger system application 200 is one of the application programs that reside on computing device 100, debugging agent 208 is one of the application programs that reside on debuggee process computer 206, and debuggee process 210 is one of the application programs that reside on debuggee process computer 206. Debugger system application 200, however, can alternatively or additionally be embodied as computer executable instructions on one or more computers and/or in different variations than illustrated in FIG. 1. Alternatively or additionally, one or more parts of debugger system application 200 can be stored in system memory 104, on other computers/applications 115, or other such suitable variations for running a debugger system application.

In one embodiment, debugging agent 208 is on a debuggee process computer 206 which is remote from debugger system computer 100 which includes debugger system application 200. In other embodiments, however, debugging agent 208 and/or debuggee process 210 resides on the same computer as debugger system application 200. The debugger system application is configured to request a current call stack of multiple threads of debuggee process 210. In the embodiment illustrated in FIG. 2, debuggee process 210 includes threads 1, 2, . . . N which correspondingly have thread registers and stack memory indicated at 212a, 212b, . . . 212c.

Embodiments of debugger system application 200, debugging agent 208, and debuggee process 210 are described in the general context of computer-executable instructions, such as program modules, being executed by a computer. Generally, program modules include routines, programs, objects, components, data structures, etc. that perform particular tasks or implement particular abstract data types. Embodiments may be practiced in distributing computing environments where tasks are performed by remote processing devices that are linked through a communications network. In a distributed computer environment, program modules may be located in both local and remote computer storage media including media storage devices.

Figure 3:
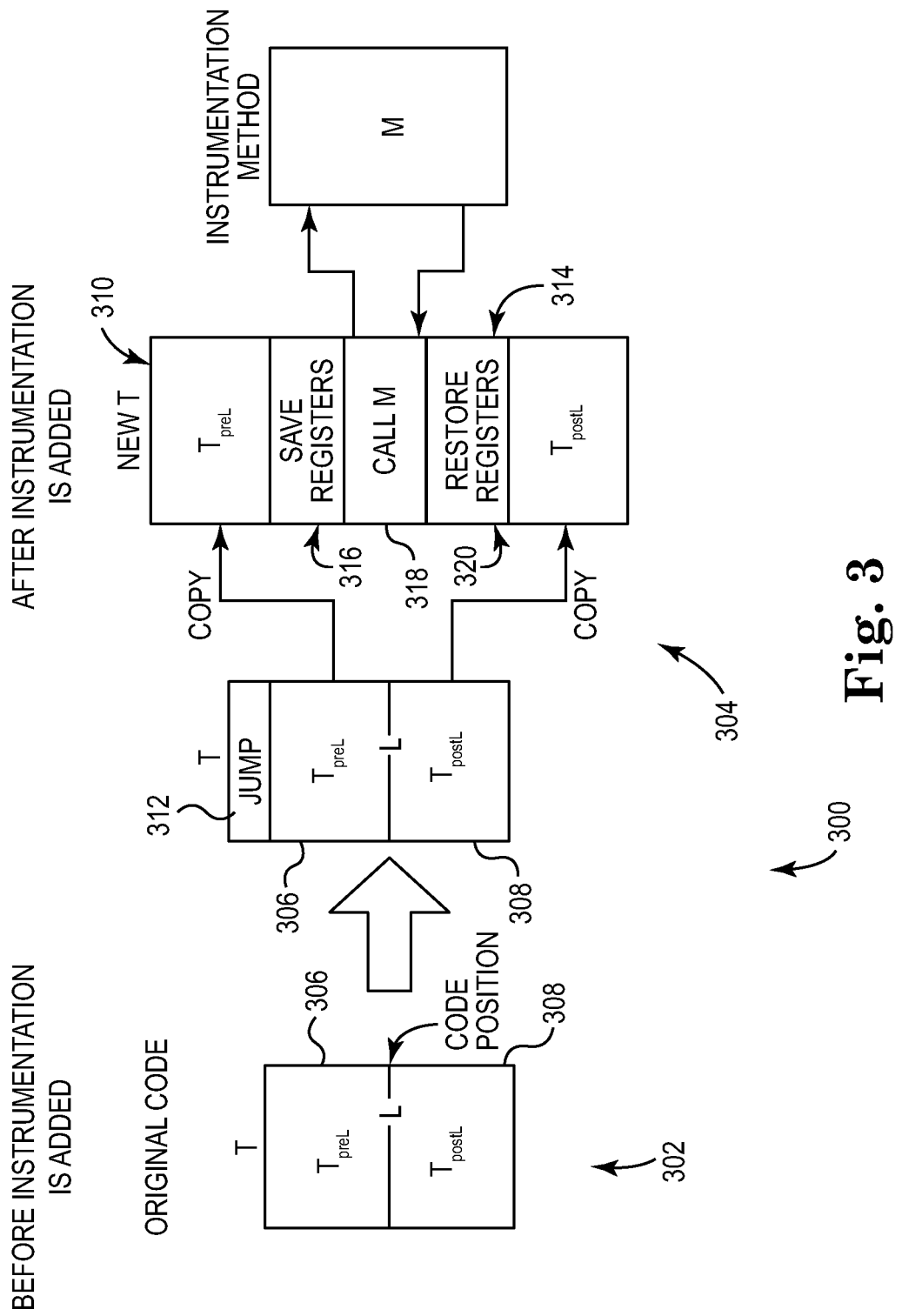
FIG. 3 is a block diagram illustrating one embodiment of a method of the debugger system application and the debuggee process computer.

FIG. 3 illustrates an example process 300 operating on the system illustrated in FIG. 2. The process 300 includes features 302 prior to adding instrumentation and features 304 after adding instrumentation.

Features 302 of process 300 illustrate a target method T that is at least a portion of code to be debugged. In one example, target method T represents a portion of code of the application related to a segment that will include an instrumentation breakpoint. In other examples, the code can include more than just the related segment. Location L represents the location of the instrumentation breakpoint included into the target method T, which is often designated by the developer. The target method T includes a first portion 306 TpreL that includes the bytes of code to be executed before location L, and target method T includes a second portion 308 TpostL that includes the bytes of code to be executed after location L.

In this example, the debugger 200 will inject code implementing the instrumentation directly into the debuggee process 210. The debuggee process 210 can then execute the instrumentation without the debugger 200. Many kinds of instrumentation can be added including conditional breakpoints, conditional traces, data structure integrity verification, pre-conditional and post-conditional verifications, event generation, statement timing, and so on. In the example process 300 illustrated in FIG. 3, the instrumentation is implemented as an instrumentation method M that is called from the location L.

Features 304 of process 300 illustrate the instrumentation implemented as the instrumentation method M. In one example, the code for instrumentation method M is compiled either by the debugger 200 or elsewhere but still under the control of the debugger 200. The debugger 200 allocates memory in the debuggee process 210 to include instrumentation method M, and then writes the bytes of the instrumentation method M to the debuggee process 210.

The debugger 200 also allocates memory in the debuggee process computer 206 to include a modified version of the target method T, which is called new T 310. New T 310 is generated prior to the execution of target method T. As the process executes the application, the process encounters an instruction 312 to create New T 310. New T 310 includes a copy of T in the debuggee process 210 that includes the first portion 306 TpreL and the second portion 308 TpostL.

New T 310 includes a feature 314 to call instrumentation method M inserted at location L. Feature 314 includes the ability to save the state of target method T at 316, run the instrumentation method M at 318, restore the state of the target method T at 320, and then proceed with TpostL 308. In one example, feature 314 can include a trampoline at location L that saves the register state of T 316 at the point after TpreL 306. The feature 314 marshalls application parameters and calls 318 the instrumentation method M. After implementation method M completes, in one example, the feature 314 restores the register state 320. The debugger 200 can then write the bytes of TpostL 308 to the new T 310.

The original code for the target method T can be modified to redirect to the call to the new T 310. When the instrumentation is removed the original target method T is restored and the memory in the debuggee process computer 206 used for the new T 310 can be reclaimed. In certain examples, a developer can place additional instrumentation points in the target method T. If an additional instrumentation points are included in the target method T, one example applies the process 300 the new T 310. In some examples, the instrumentation can be removed in an order other than that described above, the trampoline for the removed instrumentation can be disabled with a "no operation" instruction until the removal is complete.

An example debugger 200 can include several features to facilitate the process 300. For example, the debugger can include the capability to compile, or request the compilation of, the instrumentation it supports. The debugger 200 can also maintain symbolic methods that it has relocated in order to present fewer perturbations during debugging. The debugger can also create the instrumentation in the source language of the debuggee process 210, that is the language of the target method T, or it can use any other suitable language to describe the instrumentation. Further, one or more threads are capable of executing on a multiprocessor debuggee system computer 206. In this case, the debugger 200 moves the point of execution to the analogous point in the new T 310.

FIG. 4 illustrates an example process 400 for inserting instrumentation into the target method T. In the method 400, the developer or other user of the debugger enters a description of the instrumentation at 402. For example, the description of the instrumentation can include "Stop in target method T at line 10 if x>100." The debugger 200 compiles the description, or requests compilation from a language compiler, into code bytes for a method at 404. For example, the compiled description can include: "void M(int x) {if (x>100) DebugBreak( );}" The debugger 200 allocates space in the debuggee system computer 206 for new T 310 and instrumentation method M at 406. The debugger 200 writes the new T 310 and the instrumentation method M to the debuggee system computer 206 at 408. The debugger 200 writes a jump from the target method T to the new T 310 remembering the original state at 410 of the target method T at location L. The debugger 200 also finds the stack frames executing in the target method T and adjust the point of execution to new T 310 at 412. The debugger 200 also remaps symbolic information for the target method T to the new T 310 at 414.

FIG. 5 illustrates an example process 500 for removing instrumentation, such as instrumentation added in process 400 or another process. The debugger 200 permits any debuggee thread executing the instrumentation method M to continue executing until it returns from the target method M at 502. The debugger 200 restores the original state of target method T from 410 above at 504. The debugger releases the memory of the debuggee system computer 206 that was allocated for the new T 310 and the instrumentation method M at 506. The debugger 200 finds the stack frames that are executing in the new T 310 and adjusts the point of execution to the target method T at 508. The debugger also restores the original mapping of the symbolic information of the target method T at 510.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of debugging a debuggee process, comprising:
compiling a description of instrumentation as an instrumentation method having processor-executable instructions to be called from within a target method, the compiling under control of a debugger;
writing the instrumentation method with the debugger in a debuggee;
writing a new target method to supplant the target method with the debugger to include the instrumentation method into the debugger-selected location in the debuggee, wherein the new target method includes a first portion of the new target method prior to the debugger selected location and a second portion of the new target method subsequent to the debugger selected location;
saving a state of the debuggee process of the first portion of the new target method prior to the debugger-selected location in the debuggee process;
calling the instrumentation method from the new target method written in the debuggee during debuggee execution without executing the debugger; and
restoring the state of the first portion of the new target method prior to the debugger-selected location of in the debuggee process; and
resuming the debuggee process at the second portion of the new target method subsequent to the debugger selected location.

2. The method of claim 1 wherein compiling with a debugger under control of a debugger includes compiling with the debugger.

3. The method of claim 1 wherein the debugger request compilation from a language compiler to compile the description of the instrumentation.

4. The method of claim 1 wherein the instrumentation includes at least one of a conditional breakpoint, a conditional trace, a data structure integrity verification, a pre-condition verification, a post-condition verification, an event generation, and a statement timing.

5. The method of claim 1 wherein the debuggee process includes a target method.

6. The method of claim 5 wherein the writing the instrumentation includes allocating memory in the debuggee for the target method and the instrumentation method.

7. The method of claim 1 wherein the saving the state includes symbolic mapping for relocated methods.

8. The method of claim 1 saving the state includes finding stack frames.

9. A debugging system, comprising:
a debuggee having a debuggee memory and a processor configured to execute a debuggee process including a target method;
a debugger operably coupled to the debuggee, wherein the debugger is configured to write a compiled instrumentation method into the debuggee memory and to define a target location into the target method;
the debugger being configured to write a new target method to include a first portion of the new target method prior to the target location, a call to the instrumentation method at the target location into a debugger-selected location in the debuggee memory, a second portion of the new target method subsequent to the target location; and
the debuggee being configured to execute the first portion of the new target method to at least the target location prior to the target location, save the state of the first portion of the new target method, call the compiled instrumentation from the debuggee memory at the target location without executing the debugger, restore the state of the first portion of the new target method, and execute the second portion of the new target method subsequent to the target location.

10. The debugging system of claim 9 wherein the debuggee includes a first computing device and the debugger includes a second computing device operably coupled to the first computing device.

11. The debugging system of claim 9 wherein the debugger includes a debugger memory and a debugger processor.

12. The debugging system of claim 9 wherein the debugger is operably coupled to a language compiler.

13. A computer readable storage memory storing computer-executable instructions for controlling a computer system to perform a method comprising:
compiling a description of instrumentation as an instrumentation method having processor-executable instructions to be called from within a target method wherein the compiling is performed under control of a debugger;
writing the compiled instrumentation method with the debugger in a memory of a debuggee; and
writing a new target method to supplant the target method with the debugger to include the instrumentation method into the debugger-selected location in the debuggee, wherein the new target method includes a first portion of the new target method prior to the debugger selected location and a second portion of the new target method subsequent to the debugger selected location;
executing a debuggee process in the debuggee including a target method; and
building a trampoline in the new target method to the instrumentation method, the building including:
saving a state of the debuggee process of the first portion of the new target method prior to the debugger-selected location in the debuggee process, and calling the instrumentation method from the new target method written in the debuggee during debuggee execution without executing the debugger;
calling the instrumentation method from the new target method written in the debuggee during debuggee execution without executing the debugger;
restoring the state of the first portion of the new target method prior to the debugger-selected location of in the debuggee process; and
resuming the debuggee process at the second portion of the new target method subsequent to the debugger selected location.

14. The computer readable storage memory of claim 13 wherein the target method includes at least one target location.

15. The computer readable storage memory of claim 14 wherein the building the trampoline in the target method includes building the trampoline at the at least one target location.

* * * * *